United States Patent [19]

Kamikubo et al.

[11] Patent Number: 5,698,618
[45] Date of Patent: Dec. 16, 1997

[54] COATING COMPOSITION

[75] Inventors: Takashi Kamikubo; Tadashi Itabashi; Masami Kuwahara, all of Tokyo, Japan

[73] Assignee: Toyo Ink Manufacturing Co., Ltd., Tokyo, Japan

[21] Appl. No.: 683,213

[22] PCT Filed: Nov. 17, 1995

[86] PCT No.: PCT/JP95/02355

§ 371 Date: Jul. 18, 1996

§ 102(e) Date: Jul. 18, 1996

[87] PCT Pub. No.: WO96/16130

PCT Pub. Date: May 30, 1996

[30] Foreign Application Priority Data

Nov. 18, 1994 [JP] Japan ............................ 6-284854

[51] Int. Cl.$^6$ ............................................. C08K 5/42
[52] U.S. Cl. ........................ 524/88; 524/89; 524/90; 524/161; 524/162; 524/163; 524/719; 524/720
[58] Field of Search ........................ 524/88, 89, 160, 524/90, 719, 720, 161, 162, 163

[56] References Cited

U.S. PATENT DOCUMENTS

| | | | |
|---|---|---|---|
| 3,497,493 | 2/1970 | Grossman | 524/90 |
| 4,217,265 | 8/1980 | Dietz et al. | 524/90 |
| 4,369,070 | 1/1983 | Aign et al. | 524/90 |
| 4,369,270 | 1/1983 | Dietz et al. | 524/90 |
| 5,270,363 | 12/1993 | Kluger et al. | 524/90 |
| 5,430,089 | 7/1995 | Harris et al. | 524/90 |
| 5,614,014 | 3/1997 | Urban | 524/90 |

FOREIGN PATENT DOCUMENTS

| | | |
|---|---|---|
| 4-227774 | 8/1992 | Japan . |
| 4-352884 | 12/1992 | Japan . |
| 5-98200 | 4/1993 | Japan . |
| 5-295308 | 11/1993 | Japan . |
| 5-33140 | 12/1993 | Japan . |
| 6-212088 | 8/1994 | Japan . |

*Primary Examiner*—Veronica P. Hoke
*Attorney, Agent, or Firm*—Knobbe, Martens, Olson & Bear, LLP

[57] ABSTRACT

A coating composition is formed from an acid-set coating varnish and a pigment composition. The pigment composition includes a specific organic dyestuff derivative and a specific basic-group-containing resin-type pigment dispersant. The coating composition excels in pigment dispersibility, nonflocculation properties, noncrystallizability and fluidity. When used as a coating, the coating composition has excellent color tone, gloss, hardness, weather resistance, and solvent resistance.

16 Claims, No Drawings

COATING COMPOSITION

TECHNICAL FIELD

The present invention relates to a coating composition which excels in nonflocculation properties, noncrystallizability, fluidity and the like, has a clear color tone and high gloss, and has sufficient hardness of a coating film. More specifically, the present invention relates to a coating for a vehicle.

BACKGROUND TECHNOLOGY

Acid-set coatings, which contain acidic catalysts in the coatings and are set by heat, have coating films which excel in weather-resistance and the like. It is difficult for acidic rain, which has become a problem in our society in recent years, to corrode acid-set coatings, and thus such coatings have been used as coatings for vehicles.

However, because acid-set coatings contain an organic solvent, air pollution or the like is caused thereby. As countermeasures against this phenomenon, high solids coatings have been developed in which the amount of the organic solvent contained in the coating has been reduced.

In high solids acid-set coatings, there exists a drawback in that, with an increase in the coating viscosity due to a reduction in the contained amount of the organic solvent, the coating properties deteriorate. For this reason, prohibiting an increase in coating viscosity and improving the coating properties have been attempted by reducing the molecular weight of a resin forming the coating, or by completely etherifying an amino resin, or by other measures.

However, when a resin having a relatively low molecular weight is used, it is difficult to sufficiently disperse pigments, as will be described later.

On the other hand, when the amino resin is completely etherified, the reactivity inherent in the coating deteriorates. As a result, there arises a drawback in that the setting of the coating is slower than the setting of conventional acid-set coatings.

Therefore, it is necessary to either increase the amount of acid catalyst or use a strong acid catalyst in order to promote the setting of the coating.

However, when an acid-set coating to which a large amount of acid catalyst or a strong acid catalyst has been added is used, a drawback also arises in that the pigment dispersion stability of the acid-set coating becomes poor.

Thus, it is desirable to develop effective pigment dispersants and pigment compositions.

Conventionally, in various technical fields of pigment dispersion, various pigment dispersants have been used such as pigment derivatives or the like. Among these pigment dispersants, pigment derivatives having basic substituents (which will be hereinafter referred to as basic pigment derivatives), and basic-group-containing resin-type pigment dispersants obtained by binding a basic substance with a polyester, an acrylic polymer, or the like are remarkably effective in general coatings.

However, in an acid-set coating, the basic pigment derivatives or the basic-group-containing resin-type pigment dispersant interact with the acid catalyst, and pigment dispersion cannot be effectively performed. In addition, catalytic activity deteriorates and a drawback arises in that the setting of the coating is impeded, or the like.

Further, an aluminum salt of a pigment derivative having a carboxyl group is disclosed as an organic dyestuff derivative having an acidic functional group (which will be hereinafter referred to as an acid-organic dyestuff derivative) in Japanese Patent Application Publication (JP-B) No. 64-5070.

However, even when an acid-organic dyestuff derivative has been used, hardly any effect on improving the dispersibility of the pigment in an acid-set coating has been exhibited.

Moreover, a pigment derivative having a sulfone group is disclosed as the acid-organic dyestuff derivative in Japanese Patent Application Laid-Open (JP-A) No. 5-98200.

The pigment derivative having a sulfone group has exhibited excellent effects of dispersibility with respect to base resins of a relatively high molecular weight. However, a sufficient effect of dispersibility cannot be exhibited with respect to low-molecular-weight resins which have a weight average molecular weight of around 10,000 or less, and whose thixotropy does not become larger and whose coating properties are not damaged even in a high solid type.

DISCLOSURE OF THE INVENTION

In view of the aforementioned, the present inventors arrived at the present invention after diligent research and discovered that an acid-set coating composition, which excels in pigment dispersiblity, nonflocculation properties, noncrystallizability, fluidity and the like, has a clear color tone and high gloss, and has sufficient hardness of a coating film, even when a low-molecular-weight resin having a weight average molecular weight of around 10,000 or less is used, could be obtained by adding a specific amount of a specific organic dyestuff derivative having an acidic functional group, and basic-group-containing resin-type pigment dispersant to the pigment composition contained in the acid-set coating.

The present invention is a coating composition comprising: an acid-set coating varnish; and a pigment composition formed of 0.5 to 30 parts by weight, per 100 parts by weight of pigment, of an organic dyestuff derivative represented by following general formula (1) or an aluminum salt of the organic dyestuff derivative, and 0.5 to 100 parts by weight of a basic-group-containing resin-type pigment dispersant whose weight average molecular weight is 1,000 to 100,000 and whose amine value is 10 to 200 mg KOH/g.

General Formula (1)

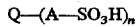

wherein Q is an organic dyestuff residue group; A is —CONH—$Y_1$—, or —$SO_2$NH—$Y_1$—, or —$CH_2$NH—$Y_1$—; $Y_1$ is an alkylene group which may have a substituent, or an alkenylene group which may have a substituent, or an arylene group which may have a substituent, formed by 1 to 20 carbon atoms; and n is an integer from 1 to 4.

Further, the acid-set coating varnish used in the present invention is formed from (a) a hydroxyl group-containing resin, (b) a higher alkyletherified melamine resin, (c) an acid catalyst, and (d) a solvent.

BEST MODE FOR IMPLEMENTING THE INVENTION

Hereinafter, the present invention will be described in detail.

It is preferable that the pigment used in the present invention is a pigment which, when used in a coating in actual practice, is satisfactory with respect to various types of resistances such as light resistance, weather resistance, solvent resistance and the like. At least one organic pigment selected from the following organic pigments can be used: phthalocyanine pigments, quinacridone pigments, isoindolinone pigments, perylene pigments, perinone pigments, dioxazine pigments, diketopyrrolopyrrole pigments, anthraquinone pigments, benzimidazolone pigments, or at least one inorganic pigment selected from the following inorganic pigments can be used: carbon black, titanium oxide, chrome yellow, cadmium yellow, cadmium red, red iron oxide, iron black, zinc white, prussian blue, ultramarine blue and the like.

In the present invention, an organic dyestuff derivative represented by following formula (1), or an aluminum salt of the organic dyestuff derivative is used.

Formula (1)

In formula (1), Q is an organic dyestuff residue group, and A is —CONH—$Y_1$—, or —$SO_2$NH—$Y_1$—, or —$CH_2$NH—$Y_1$—. $Y_1$ is an alkylene group which may have a substituent, or an alkenylene group which may have a substituent, or an arylene group which may have a substituent and is formed by 1 to 20 carbon atoms. Further, n is an integer from 1 to 4.

Examples of the organic dyestuff residue group represented by Q in formula (1) include anthraquinone dyestuffs, azo dyestuffs, phthalocyanine dyestuffs, quinacridone dyestuffs, dioxazine dyestuffs, anthrapyrimidine dyestuffs, anthanthrone dyestuffs, indanthrone dyestuffs, flavanthrone dyestuffs, pyranthrone dyestuffs, perinone dyestuffs, perylene dyestuffs, thioindigo dyestuffs, and the like.

The organic dyestuff derivative represented by formula (1) can be obtained as follows: a substituent such as —$SO_2$Cl, —COCl, —$CH_2$Cl, —$CH_2$NHCOCH$_2$Cl or the like is introduced into an organic dyestuff by a conventional method, and the substituent-introduced organic dyestuff is reacted with a compound having a sulfone group and a group which can react with the substituent in a reaction solvent such as water, alcohol, acetone or N,N-dimethylformamide, and in the presence of an alkali catalyst if necessary.

It is advantageous in practice to select an organic dyestuff derivative whose chemical structure is the same as or similar to the pigment used therewith. Namely, the effects on nonflocculation properties, noncrystallizability, fluidity and the like are great, and as compared with a case in which the pigment is used singly, there is little variation in hue, which is preferable.

A colorless or slightly-colored derivative such as anthraquinone derivatives or the like has little variation in hue even when added to the pigment, and is advantageous in that it excels in adaptability.

$Y_1$ in formula (1) is preferably a phenylene group, ethylene group, or the like.

Since the organic dyestuff derivative is an aluminum salt in the present invention, it is advantageous with respect to the preparation thereof. Namely, in the preparation of an organic dyestuff derivative having a sulfone group, ordinarily, after sulfone group has been introduced, a great volume of water is introduced and filtered off. However, in this case, a drawback arises in that filtering requires much time because the organic dyestuff derivative has a high affinity for water. When an aluminum salt is used for the sulfone group, the affinity for water becomes lower. As a result, filtering of the organic dyestuff derivative becomes easy and the filtering time can be reduced.

The basic-group-containing resin-type pigment dispersant used in the present invention is a copolymeric product prepared by binding a basic substance and a polyester compound or an acryl polymer, and has a weight average molecular weight of 1,000 to 100,000 and an amine value of 10 to 200 mgKOH/g and is disclosed in Japanese Patent Application Laid-Open (JP-A) Nos. 60-166318, 61-174939, 46-7294, and the like.

When the basic-group-containing resin-type pigment dispersant has a weight average molecular weight of less than 1,000, steric hindrance cannot be sufficiently exhibited and the dispersion effect deteriorates. Even when the pigment dispersant has a weight average molecular weight of greater than 100,000, conversely, there is the possibility that flocculation will occur, which is not preferable.

Further, when the amine value of the pigment dispersant is less than 10 mgKOH/g, the pigment dispersant cannot sufficiently interact with the above-described organic dyestuff derivative or an aluminum salt of the organic dyestuff derivative. Therefore, even if the organic dyestuff derivative is adsorbed to the surface of the pigment, the dispersion effect cannot be obtained. When the amine value of the pigment dispersant is greater than 200 mgKOH/g, as compared with an affinity portion for pigment components, a steric hindrance portion is reduced and the dispersion effect cannot be sufficiently obtained, which is not preferable.

The basic-group-containing resin-type pigment dispersant may be a commercially-available product, and examples thereof are Solsperse 24000 (manufactured by Zeneca Kabushiki Kaisha), Disperbyk-160, Disperbyk-161, Disperbyk-162, Disperbyk-163 (manufactured by BYK-chemie), and the like.

The pigment compositions and coating compositions according to the present invention are obtained by using the above-described organic dyestuff derivatives or an aluminum salt of the organic dyestuff derivatives, and the basic-group-containing resin-type pigment dispersant.

The amount of the organic dyestuff derivative or aluminum salt of the organic dyestuff derivative added is preferably 0.5 to 30 parts by weight per 100 parts by weight of pigment. The amount of the basic-group-containing resin-type pigment dispersant added is preferably 0.5 to 100 parts by weight per 100 parts by weight of pigment.

If the amount of the organic dyestuff derivative or aluminum salt of the organic dyestuff derivative added, or the amount of the basic-group-containing resin-type pigment dispersant added are each less than 0.5 parts by weight, the pigment dispersion effect is weak, which is not preferable. Even if more than 30 parts by weight of the organic dyestuff derivative or aluminum salt of the organic dyestuff derivative is used, effects commensurate with the extra used amount will not be obtained. Further, if more than 100 parts by weight of the basic-group-containing resin-type pigment dispersant is used, not only effects will not be obtained, but also the hardness of the coating will deteriorate.

The method of preparing the coating composition of the present invention may be carried out as follows: the pigment, the organic dyestuff derivative or an aluminum salt of the organic dyestuff derivative, and the basic-group-containing resin-type pigment dispersant are added to an acid-set coating varnish, these components are dispersed by using a dispersing device such as a ball mill or a sand mill, and additives such as an anti-sagging agent or the like can be added as needed. It is preferable to blend the pigment and the organic dyestuff derivative or an aluminum salt of the organic dyestuff derivative into a paste or a slurry in advance.

Further, in a case in which a pigment for which a pigmentizing process such as solvent salt milling is necessary (i.e., copper phthalocyanine pigments, quinacridone pigments, dioxazine pigments, or the like) is used, the organic dyestuff derivative can be blended during the pigmentizing process.

A hydroxyl group-containing resin (a) used in the present invention is the base resin and has, in each molecule, at least two hydroxyl groups which are reactive sites with the higher alkyletherified melamine resin (b). Examples of the hydroxyl group-containing resin include polyesterpolyol resin, alkydpolyol resin, acrylpolyol resin, epoxypolyol resin, epoxyesterpolyol resin and the like. Among these resins, at least one resin selected from the group of acrylpolyol resin and alkydpolyol resin is preferable. The weight average molecular weight of the hydroxyl group-containing resin (a) is not limited particularly since the hydroxyl group-containing resin excels in dispersibility of the pigment in a wide range from low molecular weights to high molecular weights due to use of the organic dyestuff derivative or an aluminum salt of the organic dyestuff derivative together with the basic-group-containing resin-type pigment dispersant. In a conventional dispersant, a hydroxyl group-containing resin having a molecular weight of less than 10,000 does not allow for an improvement in the dispersibility of the pigment. However, in the present invention, a hydroxyl group-containing resin having a molecular weight of less than 10,000 can be used if necessary.

The polyesterpolyol is obtained by an esterification reaction of polyhydric alcohol having 2 to 6 hydroxyl groups in each molecule, a polybasic acid having 2 to 4 carboxyl groups in each molecule, and optionally, a monobasic acid or a monohydric alcohol. Examples of the polyhydric alcohol include ethylene glycol, polyethylene glycol, neopentyl glycol, 1,6-hexanediol, pentanediol, butylene glycol, 1,5-pentanediol, trimethylolethane, trimethylolpropane, glycerin, pentaerythritol and the like. Examples of the polybasic acid include phthalic acid, isophthalic acid, terephthalic acid, maleic acid, methyl terephthalate, tetrahydrophthalic acid, trimellitic acid, pyromellitic acid, and anhydrides thereof.

The alkydpolyol resin is obtained by esterifying the above polyhydric alcohol with the above polybasic acid, a fat and oil such as castor oil, linseed oil, safflower oil, soybean oil, corn oil, cotton seed oil, hempseed oil, rice bran oil, coconut oil, olive oil, and palm oil, or with a fatty acid such as heptanoic acid, octanoic acid, nonanoic acid, decanoic acid, and isostearic acid.

The acrylpolyol resin is obtained by homopolymerizing a hydroxyl group-containing vinyl monomer, or by copolymerizing a hydroxyl group-containing vinyl monomer and any one of alkyl(meth)acrylate monomer, a carboxylic acid-containing monomer, a styrenic monomer and a vinyl monomer. The hydroxyl group-containing vinyl monomer is selected, for example, from (meth)acrylic acid hydroxyesters such as hydroxyethyl (meth)acrylate, hydroxypropyl (meth)acrylate or the like, and adducts of the (meth)acrylic acid hydroxyesters with lactones such as ε-caprolactone and γ-valerolactone. The alkyl (meth)acrylate monomer is selected from, for example, methyl (meth)acrylate, ethyl (meth)acrylate, and propyl (meth)acrylate. The carboxylic acid-containing monomer is selected from, for example, acrylic acid, methacrylic acid, and itaconic acid. The styrenic monomer is selected, for example, from styrene and α-methylstyrene. The vinyl monomer is selected, for example, from acrylonitrile, methacrylonitrile and vinyl acetate.

As the epoxypolyol resin, hydroxyl group-containing epoxy resins such as Epikote™ 828, 1001, 1004, 1007 and the like manufactured by Yuka Shell Epoxy Kabushiki Kaisha can be used.

The epoxyesterpolyol resin is obtained by reacting any of the above epoxypolyol resins with any of the above monobasic acids or polybasic acids.

As the hydroxyl group-containing resin (a) used in the present invention, a modified polyol resin obtained by modifying the polyol resin with a silicone resin or with an isocyanate compound such as tolylene diisocyanate, hexamethylene diisocyanate, isophorone diisocyanate or the like can be used.

The higher alkyletherified melamine resin (b) used in the present invention, which generates carbonium ions in the presence of the acid catalyst, is a cross-linking agent and is a melamine resin in which the amino group is either completely alkyletherified or is alkyletherified about 50% or more.

Here, the amount of the alkylether groups is 100% in a case in which all of the end OH groups have been substituted by alkoxy groups after all of the hydrogen atoms of the amino groups in the melamine resin have been substituted by alkanol, and expresses in a percentage the average proportion of the alkylether groups actually added.

The degree of alkyletherification of the melamine resin must be greater than or equal to 50%. If the degree of alkyletherification is less than 50%, the acid resistance of the coating film deteriorates.

In the higher alkyletherified melamine resin, for example, the H of the methylol group binded to the amino group is substituted by an alkyl group. Examples of the alkyl group include methyl group, ethyl group, n-butyl group, isobutyl group and the like.

This type of melamine resin is, ordinarily, obtained by etherification, with a monohydric alcohol having 1 to 4 carbon atoms, of a product obtained by an addition reaction or an addition condensation reaction of an aldehyde such as formaldehyde or paraformaldehyde with a melamine resin.

These alkyletherified melamine resins are synthesized by usual methods, and it is preferable to use resins having a number average molecular weight of 2000 or less. When the number-average molecular weight exceeds 2000, it becomes difficult for the coating to high-solidify.

Because the self-condensation property of the higher alkyletherified melamine resin (b) of the present invention is weak, an acid catalyst (c) must be added in order to activate the melamine resin to produce carbonium ions.

Examples of the acid catalyst include sulfonic acid compounds such as paratoluenesulfonic acid, dodecylbenzenesulfonic acid, alkylbenzenesulfonic acid and alkylnapthalenesulfonic acid; phosphoric acid compounds such as metaphosphoric acid, orthophosphoric acid, pyrophosphoric acid, tripolyphosphoric acid, phosphoric acid, trimetaphosphoric acid, triphosphoric acid, tetrametaphosphoric acid, phosphorous acid, monobutylphosphoric acid, monoethylhexylphosphoric acid and monolaurylphosphoric acid; carboxylic acid compounds such as formic acid, oxalic acid, acetic acid and lactic acid; mineral acids such as sulfuric acid and hydrochloric acid; and mineral acid salts such as ammonium hydrochloride. Among these, sulfonic acid compounds such as paratoluenesulfonic acid, dodecylbenzenesulfonic acid, alkylbenzenesulfonic acid and alkylnapthalenesulfonic acid are particularly preferable. These acid catalysts may be blocked by an amine.

The mixing weight ratio of the hydroxyl group-containing resin (a) and the higher alkyletherified melamine resin (b) is about 90/10 to about 30/70 (hydroxyl group-containing resin/higher alkyletherified melamine resin).

The mixing amount of the acid catalyst is about 0.3 to about 5 percent by weight of the solid content of the entire resin. When the amount of the acid catalyst is less than 0.3 percent by weight, the active hydrogen substitution reaction does not proceed satisfactorily, and the coating film does not set sufficiently. On the other hand, when the amount exceeds 5 percent by weight, the coating film is hard and brittle.

Examples of the solvent (d) for dissolving the resin include Solvesso 100 (Exxon Chemical); hydrocarbons such as toluene and xylene; ketones such as methyl ethyl ketone and methyl isobutyl ketone; esters such as ethyl acetate and butyl acetate; ethers such as dioxane and ethylene glycol diethyl ether; and alcohols such as butanol and propanol. These solvents can be used singly or can be mixed appropriately.

The weight ratio of the pigment composition and the acid-set coating varnish is preferably 3/97 to 50/50, and more preferable 5/95 to 30/70. When this weight ratio is less than 3/97, the tinting strength of the coating is reduced, and when the weight ratio exceeds 50/50, the dispersibility of the pigment becomes difficult and the coating quality deteriorates.

EXAMPLES

The present invention will be described with reference to the following examples. In the examples, "parts" is used to designate parts by weight and "%" is used to designate percent by weight.

Preparation Example 1

A mixture of a solution of 10% acetic acid (200 parts), p-aminobenzene sulfonic acid (36 parts) and anthraquinone-2-carbonylchloride (20 parts) was reacted at 60° C. for two hours. Thereafter, the reaction mixture was filtered, rinsed with water, dried and ground so that an organic dyestuff derivative (1) (14 parts) represented by the following formula was obtained.

Organic Dyestuff Derivative (1)

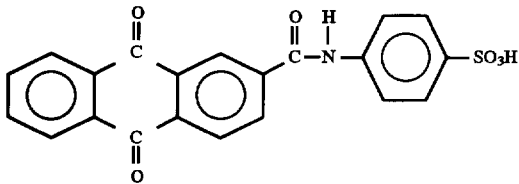

Preparation Example 2

A mixture of water (200 parts), aminoethane sulfonic acid (16 parts), anthraquinone-2-sulfonylchloride (20 parts) and sodium carbonate (7 parts) was reacted at 60° C. for two hours. Thereafter, the reaction mixture was filtered, rinsed with water, dried and ground so that an organic dyestuff derivative (2) (13 parts) represented by the following formula was obtained.

Organic Dyestuff Derivative (2)

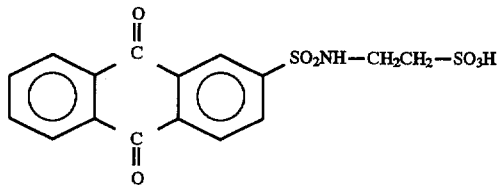

Preparation Example 3

A mixture of water (200 parts), p-aminobenzene sulfonic acid (38 parts), 2-chloromethylanthraquinone (20 parts) and sodium carbonate (7 parts) was reacted at 60° C. for two hours. Thereafter, the reaction mixture was filtered, rinsed with water, dried and ground so that an organic dyestuff derivative (3) (13 parts) represented by the following formula was obtained.

Organic Dyestuff Derivative (3)

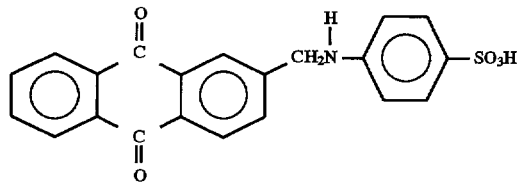

Preparation Example 4

A mixture of a solution of 10% acetic acid (200 parts), p-aminobenzene sulfonic acid (16 parts) and copper phthalocyaninecarbonylchlorlde (20 parts) was reacted at 60° C. for two hours. Thereafter, the reaction mixture was filtered, rinsed with water, dried and ground so that an organic dyestuff derivative (4) (12 parts) represented by the following formula was obtained.

Organic Dyestuff Derivative (4)

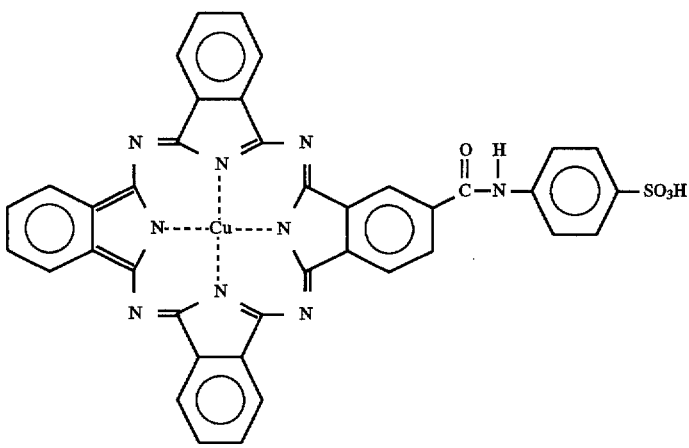

Preparation Example 5

A mixture of a solution of 10% acetic acid (200 parts), p-aminobenzene sulfonic acid (28 parts) and quinacridone-2-carbonylchloride (20 parts) was reacted at 60° C. for two hours. Thereafter, the reaction mixture was filtered, rinsed with water, dried and ground so that an organic dyestuff derivative (5) (13 parts) represented by the following formula was obtained.

Organic Dyestuff Derivative (5)

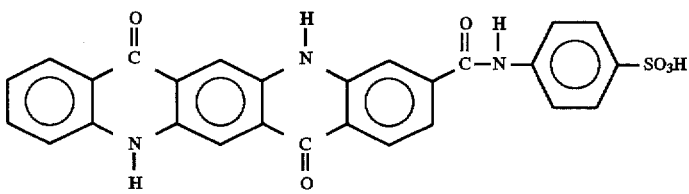

Preparation Example 6

The organic dyestuff derivative (1) (5 parts) of Preparation Example 1 was made into a slurry by adding water (2000 parts) thereto. Sodium hydroxide was added to make the mixture slightly alkaline. After the mixture was heated to 60° C., a solution of aluminum sulfate (2 parts) was added, and a sulfonated material was formed into an aluminum salt. The mixture thus produced was filtered, rinsed with water, dried and ground so that an organic dyestuff derivative (9) (5 parts) was obtained.

Examples 1 through 7, Comparative Examples 1 through 6

As shown in Table 1, a pigment (C.I. Pigment Red 177), an organic dyestuff derivative, a basic-group-containing resin-type pigment dispersant ("Solsperse 24000" manufactured by Zeneca Kabushiki Kaisha), an acryl resin (i.e., styrene/n-butylacrylate/2ethylhexylarcylate/2hydroxyethylmethacrylate/methacrylic acid copolymer, weight average molecular weight: 8,000) and Solvesso 100 (manufactured by Exxon Chemical Kabushiki Kaisha) were blended and dispersed, and thereafter, a complete alkoxymethylated melamine resin ("Cymel 303" manufactured by Mitsui-Cytec Ltd.) and an acid catalyst (dodecylbenzenesulfonic acid ("Nacure 5225" manufactured by King Industries) were mixed in so that acid-set coatings were obtained. Note that the organic dyestuff derivative (6) listed in Table 1 was prepared with anthraquinone being substituted by a sulfone group as represented by the following formula.

Organic Dyestuff Derivative (6)

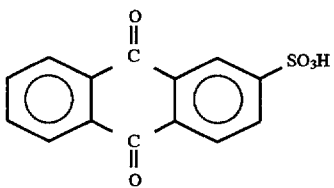

The viscosities of these acid-set coatings were measured, and the results are listed in Table 1. These results show that the thixotropical characteristics (TI values) of the coating compositions of the present invention are smaller than those of the coating compositions of the comparative examples, namely, the coating compositions of the present invention excel in fluidity.

Further, these coating compositions were viscosity-modified to 20 seconds by using a Ford cup #4 and were applied by airspraying, such that the thickness of the coating film was approximately 30 μm when dry, onto coated plates which had been intercoated in advance (i.e., steel plates on which a primer coating is coated). After the coating compositions set for 10 minutes, the coated plates were baked at 140° C. for 30 minutes.

As can be seen from Table 1, even when a basic-group-containing resin-type pigment dispersant was used, the setting of the coating compositions of the present invention was not impeded and an excellent hardness of the coating film was exhibited. Further, the coated surface glosses of the coating compositions of the present invention were superior to those of the compositions of the comparative examples.

Nonflocculation properties and noncrystallizability were evaluated based on color separation stability, which is especially problematic in practice.

Pale color coatings were prepared by diluting the above coating compositions with a titanium oxide base coating (i.e., a dispersion paste of titanium oxide with 50 phr of titanium oxide being dispersed with acryl/melamine resin) such that the pigment to titanium oxide ratio was 1/10. Next, the coating compositions were diluted with Solvesso 100, and after viscosities were modified to 20 seconds by using a Ford cup #4, the coating compositions were injected into test tubes. Variations in the coating compositions on the glass wall surfaces were observed, and it was found that there was less color separation over time of the coating compositions of the present invention than of those of the comparative examples.

TABLE 1

| Coating Mixture | Example | | | | | | |
|---|---|---|---|---|---|---|---|
| | 1 | 2 | 3 | 4 | 5 | 6 | 7 |
| Pigment 1) | 11.4 | 10.8 | 10.8 | 9.6 | 11.4 | 11.4 | 11.4 |
| Organic Dyestuff Derivative (6) | — | — | — | — | — | — | — |
| Organic Dyestuff Derivative (1) | 0.6 | 1.2 | 1.2 | 2.4 | — | — | — |
| Organic Dyestuff Derivative (2) | — | — | — | — | 0.6 | — | — |
| Organic Dyestuff Derivative (3) | — | — | — | — | — | 0.6 | — |
| Organic Dyestuff Derivative (9) | — | — | — | — | — | — | 0.6 |
| Basic-Group-Containing Resin-Type Pigment Dispersant 2) | 1.2 | 1.2 | 2.4 | 4.8 | 1.2 | 1.2 | 1.2 |
| Acryl Resin 3) | 22.8 | 22.8 | 21.6 | 19.2 | 22.8 | 22.8 | 22.8 |
| Melamine Resin 4) | 24.0 | 24.0 | 24.0 | 24.0 | 24.0 | 24.0 | 24.0 |
| Acid Catalyst 5) | 1.0 | 1.0 | 1.0 | 1.0 | 1.0 | 1.0 | 1.0 |
| Solvesso 100 | 39.0 | 39.0 | 39.0 | 39.0 | 39.0 | 39.0 | 39.0 |
| Quality of Coating | | | | | | | |
| Fluidity 6) | | | | | | | |
| 6 rpm (cps) | 150 | 300 | 220 | 450 | 250 | 230 | 160 |
| 60 rpm (cps) | 150 | 270 | 200 | 350 | 220 | 210 | 160 |
| TI Value | 1.00 | 1.11 | 1.10 | 1.29 | 1.14 | 1.10 | 1.00 |
| Coated Surface Gloss 7) | | | | | | | |
| 20° G (%) | 96.1 | 92.0 | 93.3 | 88.6 | 90.5 | 92.5 | 95.5 |
| 60° G (%) | 103.3 | 99.1 | 99.8 | 94.7 | 97.0 | 98.8 | 102.7 |
| Pencil Hardness | H | H | H | H | H | H | H |

| Coating Mixture | Comparative Example | | | | | |
|---|---|---|---|---|---|---|
| | 1 | 2 | 3 | 4 | 5 | 6 |
| Pigment 1) | 11.4 | 11.4 | 11.4 | 9.6 | 11.4 | 11.4 |
| Organic Dyestuff Derivative (6) | 0.6 | 0.6 | — | — | — | — |
| Organic Dyestuff Derivative (7) | — | — | 0.6 | 2.4 | — | — |

TABLE 1-continued

| | | | | | | |
|---|---|---|---|---|---|---|
| Organic Dyestuff Derivative (1) | — | — | — | — | 0.6 | — |
| Organic Dyestuff Derivative (2) | — | — | — | — | — | 0.6 |
| Organic Dyestuff Derivative (3) | — | — | — | — | — | 0.6 |
| Organic Dyestuff Derivative (9) | — | — | — | — | — | 0.6 |
| Basic-Group-Containing Resin-Type Pigment Dispersant 2) | — | 1.2 | — | 14.0 | — | — |
| Acryl Resin 3) | 24.0 | 22.8 | 24.0 | 10.0 | 24.0 | 24.0 |
| Melamine Resin 4) | 24.0 | 24.0 | 24.0 | 24.0 | 24.0 | 24.0 |
| Acid Catalyst 5) | 1.0 | 1.0 | 1.0 | 1.0 | 1.0 | 1.0 |
| Solvesso 100 | 39.0 | 39.0 | 39.0 | 39.0 | 39.0 | 39.0 |
| Quality of Coating | | | | | | |
| Fluidity 6) | | | | | | |
| 6 rpm (cps) | 1800 | 1200 | 1350 | 1000 | 1530 | 1450 |
| 60 rpm (cps) | 950 | 900 | 780 | 750 | 850 | 800 |
| TI Value | 1.89 | 1.33 | 1.73 | 1.33 | 1.80 | 1.81 |
| Coated Surface Gloss 7) | | | | | | |
| 20° G (%) | 55.8 | 68.0 | 62.8 | 58.0 | 60.8 | 60.0 |
| 60° G (%) | 83.0 | 87.0 | 85.2 | 83.8 | 84.5 | 84.3 |
| Pencil Hardness | H | 3B | H | 3B | H | H |

Notes:
1) Pigment: C.I. Pigment Red 177 (anthraquinone pigment)
2) Basic-group-containing resin-type pigment dispersant: Solsperse 24000 (manufactured by Zeneca Kabushiki Kaisha), amine value 35 to 51 mgKOH/g, weight average molecular weight: 12,000
3) Acryl resin: styrene/n-butylacrylate/2ethylhexylacrylate/2hydroxyethylmethacrylate/methacrylic acid copolymer, weight average molecular weight 8000, acid value 15 mgKOH/g, hydroxyl value 50 mgKOH/g
4) Melamine resin: Cymel 303 (complete alkoxymethylated melamine, manufactured by Mitsui-Cytec Ltd.)
5) Acid catalyst: Nacure 5225 (dodecylbenzenesulfonic acid, manufactured by King Industries)
6) Fluidity: Measured at 25° C. by using a B-type rotational viscosimeter, TI Value: viscosity at the time of 6 rpm/viscosity at the time of 60 rpm
7) Gloss: Gloss values at 20 degree and 60 degree angles of deviation Examples 8 through 12, Comparative Examples 8, 10, 12, 14, 16

In the same manner as in Example 1, acid-set coatings were prepared by blending and dispersing the pigments listed in Table 2 (11.4 parts), the organic dyestuff derivatives (0.6 parts), the basic-group-containing resin-type pigment dispersant ("Solsperse 24000" manufactured by Zeneca Kabushiki Kaisha, 1.2 parts), the above acryl resin (22.8 parts), the above complete alkoxymethylated melamine resin (24 parts), an acid catalyst (1 part) and Solvesso 100 (39 parts).

Comparative Examples 7, 9, 11, 13, 15

In the same manner as in Comparative Example 1, acid-set coatings were prepared by blending and dispersing the pigments listed in Table 2 (11.4 parts), the organic dyestuff derivatives (0.6 parts), the above acryl resin (24 parts), the above complete alkoxymethylated melamine resin (24 parts), an acid catalyst (1 part) and Solvesso 100 (39 parts).

In Table 2, the contained amount of the above organic dyestuff derivative is 5%, with the total amount of the pigment and the organic dyestuff derivative being set as a reference. The contained amount of the basic-group-containing resin-type pigment dispersant is 10% with respect to the total amount of the pigment and the organic dyestuff derivative.

Further, the organic dyestuff derivatives (6), (7) and (8) listed in Table 2 are each obtained with the organic dyestuff residue group being substituted by a sulfone group. The organic dyestuff derivatives (6), (7) and (8) are anthraquinone dyestuffs, phthalocyanine dyestuffs, and quinacridone dyestuffs, respectively.

manners similar to those of Examples 1 through 6 and Comparative Examples 1 through 6, and the results are listed in Table 2.

TABLE 2

| Example/ Comparative Example | Pigment | Organic Dyestuff Derivative (Product symbol) | (%) | Basic-Group-Containing Pigment Dispersant (%) | Fluidity (CPS) 6 rpm | 60 rpm | TI Value | Gloss (%) 20° G | 60° G | Pencil Hardness |
|---|---|---|---|---|---|---|---|---|---|---|
| Comparative Example 7 | C.I. Pigment Red 178 (perylene pigment) | (6) | 5 | — | 4360 | 910 | 4.79 | 75.0 | 88.5 | H |
| Comparative Example 8 | | (6) | 5 | 10 | 2930 | 760 | 3.84 | 78.2 | 90.2 | 3B |
| Example 8 | | (1) | 5 | 10 | 270 | 250 | 1.08 | 90.0 | 100.4 | H |
| Comparative Example 9 | C.I. Pigment Green 36 (phthalocyanine pigment) | (6) | 5 | — | 4080 | 850 | 4.79 | 75.2 | 88.0 | H |
| Comparative Example 10 | | (6) | 5 | 10 | 2830 | 740 | 3.82 | 78.9 | 89.0 | 3B |
| Example 9 | | (1) | 5 | 10 | 240 | 240 | 1.00 | 83.8 | 95.3 | H |
| Comparative Example 11 | C.I. Pigment Red 254 (diketopyrrolo-pyrrole pigment) | (6) | 5 | — | 1900 | 1180 | 1.61 | 65.0 | 85.0 | H |
| Comparative Example 12 | | (6) | 5 | 10 | 1190 | 570 | 210 | 78.0 | 90.3 | 3B |
| Example 10 | | (1) | 5 | 10 | 290 | 260 | 1.11 | 89.3 | 99.5 | H |
| Comparative Example 13 | C.I. Pigment Blue 15:1 (phthalocyanine pigment) | (7) | 5 | — | 3200 | 780 | 4.10 | 68.7 | 90.6 | H |
| Comparative Example 14 | | (7) | 5 | 10 | 770 | 330 | 2.05 | 70.5 | 92.2 | 3B |
| Example 11 | | (4) | 5 | 10 | 200 | 200 | 1.00 | 85.8 | 96.7 | H |
| Comparative Example 15 | C.I. Pigment Red 202 (quinacridone pigment) | (8) | 5 | — | 1500 | 880 | 1.70 | 63.8 | 90.2 | H |
| Comparative Example 16 | | (8) | 5 | 10 | 510 | 490 | 1.04 | 72.4 | 92.4 | 3B |
| Example 12 | | (5) | 5 | 10 | 220 | 220 | 1.00 | 89.8 | 100.8 | H |

Organic Dyestuff Derivative (7)

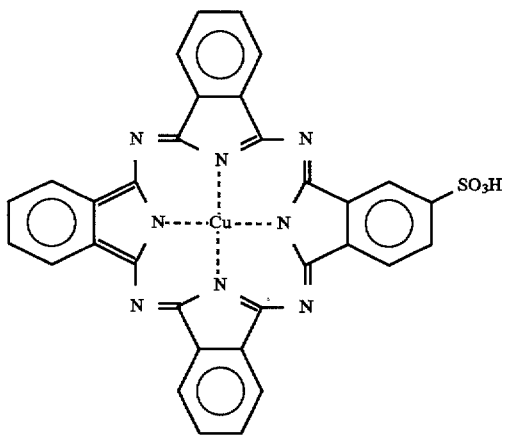

Organic Dyestuff Derivative (8)

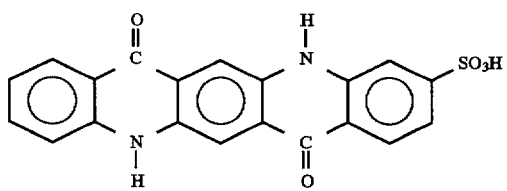

The fluidities of the coatings, the coated surface glosses, and the hardnesses of the coating films were evaluated in The added amount of the organic dyestuff derivative is expressed in a ratio to the total amount of the pigment and the organic dyestuff derivative. The added amount of the basic-group-containing pigment dispersant is expressed in a ratio to the total amount of the pigment and the organic dyestuff derivative.

Fluidity: Measured at 25° C. and by using a B-type rotational viscosimeter

TI Value: Viscosity at the time of 6 rpm/viscosity at the time of 60 rpm

Gloss: Gloss values at 20 degree and 60 degree angles of deviation

As can be seen from Table 2, comparison of the fluidities of the coatings and the coated surface glosses revealed that the fluidities and glosses of the coating compositions of the present invention were superior to those of the coating compositions of the comparative examples. Further, the setting of the coating compositions of the present invention was not impeded even when a basic-group-containing resin-type pigment dispersant was used, which reveals excellent hardness of the coating film.

INDUSTRIAL AVAILABILITY

The acid-set coating compositions of the present invention excel in nonflocculation properties, noncrystallizability and fluidity, and the gloss and hardness of the coating film are also excellent. Further, the weather resistance and solvent resistance of the coating compositions of the present invention are improved over a case in which a pigment is used alone. Accordingly, the coating compositions of the present invention are suitable for use in a coating for a vehicle or the like.

We claim:

1. A coating composition comprising:

an acid-set coating varnish formed from (a) a hydroxyl group-containing resin, (b) a higher alkyletherified melamine resin, (c) an acid catalyst, and (d) a solvent; and a pigment composition formed of 0.5 to 30 parts by weight, per 100 parts by weight of pigment, of an organic dyestuff derivative of formula (1)

wherein Q is an organic dyestuff residue group; A is $—CONH—Y_1—$, or $—SO_2NH—Y_1—$, or $—CH_2NH—Y_1—$; $Y_1$ is an alkylene group which may have a substituent, or an alkylene group which may have a substituent, or an arylene group which may have a substituent, formed by 1 to 20 carbon atoms; and n is an integer from 1 to 4, and 0.5 to 100 parts by weight of a basic-group-containing resin-type pigment dispersant whose weight average molecular weight is 1,000 to 100,000 and whose amine value is 10 to 200 mg KOH/g wherein the weight ratio of said pigment composition to said acid-set coating varnish is from 3/97 to 50/50.

2. A coating composition according to claim 1, wherein said organic dyestuff derivative is a compound represented by following formula (1),

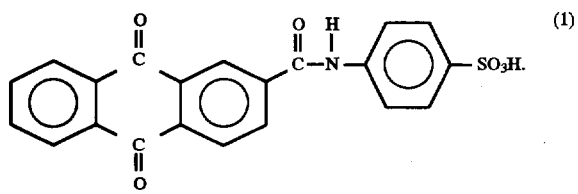

3. A coating composition according to claim 1, wherein said hydroxyl group-containing resin (a) is selected from the group consisting of acrylpolyol resin and alkydpolyol resin.

4. A coating composition according to claim 1, wherein a weight average molecular weight of said hydroxyl group-containing resin (a) is 10,000 or less.

5. A coating composition according to claim 1, wherein a number average molecular weight of said higher alkyletherified melamine resin (b) is 2,000 or less.

6. A coating composition according to claim 1, wherein a degree of alkyletherification of said higher alkyletherified melamine resin (b) is 50% or more.

7. A coating composition according to claim 1, wherein the weight ratio of said hydroxyl group-containing resin (a) to said higher alkyletherified melamine resin (b) is from 90/10 to 30/70.

8. A coating composition according to claim 1, wherein the mixed amount of said acid catalyst (c) is 0.3 to 5 percent by weight of the solid content of the entire resin of said coating composition.

9. A coating composition comprising;

an acid-set coating varnish formed from (a) a hydroxyl group-containing resin, (b) a higher alkyletherified melamine resin, (c) an acid catalyst, and (d) a solvent; and a pigment composition formed of 0.5 to 30 parts by weight, per 100 parts by weight of pigment, of an aluminum salt of organic dyestuff derivative of formula (1)

wherein Q is an organic dyestuff residue group; A is $—CONH—Y_1—$, or $—SO_2NH—Y_1—$, or $—CH_2NH—Y_1$ is an alkylene group which may have a substituent, or an alkylene group which may have a substituent, or an arylene group which may have a substituent, formed by 1 to 20 carbon atoms; and n is an integer from to 4, and 0.5 to 100 parts by weight of a basic-group-containing resin-type pigment dispersant whose weight average molecular weight is 1,000 to 100,000 and whose amine value is 10 to 200 mg KOH/g wherein the weight ratio of said pigment composition to said acid-set coating varnish is from 3/97 to 50/50.

10. A coating composition according to claim 9, wherein said aluminum salt of the organic dyestuff derivative is an aluminum salt of a compound represented by following formula

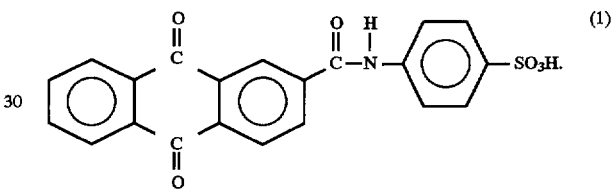

11. A coating composition according to claim 1, wherein said hydroxyl group-containing resin (a) is selected from the group consisting of acrylpolyol resin and alkydpolyol resin.

12. A coating composition according to claim 1, wherein a weight average molecular weight of said hydroxyl group-containing resin (a) is 10,000 or less.

13. A coating composition according to claim 1, wherein a number average molecular weight of said higher alkyletherified melamine resin (b) is 2,000 or less.

14. A coating composition according to claim 1, wherein a degree of alkyletherification of said higher alkyletherified melamine resin (b) is 50% or more.

15. A coating composition according to claim 1, wherein the weight ratio of said hydroxyl group-containing resin (a) to said higher alkyletherified melamine resin (b) is from 90/10 to 30/70.

16. A coating composition according to claim 1, wherein the mixed amount of said acid catalyst (c) is 0.3 to 5 percent by weight of the solid content of the entire resin of said coating composition.

* * * * *